United States Patent [19]

Koishi

[11] Patent Number: 4,740,685
[45] Date of Patent: Apr. 26, 1988

[54] DOUBLE SWEEP STREAK CAMERA DEVICE

[75] Inventor: Musubu Koishi, Shizuoka, Japan

[73] Assignee: Hamamatsu Photonics Kabushiki Kaisha, Shizuoka, Japan

[21] Appl. No.: 14,445

[22] Filed: Feb. 13, 1987

[30] Foreign Application Priority Data

Feb. 14, 1986 [JP] Japan ................................. 61-30287

[51] Int. Cl.$^4$ ............................................. H01J 40/14
[52] U.S. Cl. ............................... 250/213 VP; 313/537
[58] Field of Search ................. 250/213 VT; 313/525, 313/534, 537, 542

[56] References Cited

U.S. PATENT DOCUMENTS

4,243,878  1/1981  Kalibjian ...................... 250/213 VT
4,661,694  4/1987  Corcoran ............................. 313/542
4,682,020  7/1987  Alfano ................................. 313/537

Primary Examiner—David C. Nelms
Assistant Examiner—Stephone B. Allen
Attorney, Agent, or Firm—Finnegan, Henderson, Farabow, Garrett & Dunner

[57] ABSTRACT

The double sweep streak camera device of the present invention includes a streak tube having a pair of first deflecting electrodes for forming a deflecting electric field in the direction of a time axis at the rear stage of a focusing electronic lens system in an image tube and a pair of second deflecting electrodes for forming a deflecting electric field substantially perpendicular to the aforementioned deflecting electric field formed by the first deflecting electrode. A DC high voltage generating unit supplies operating voltages to the streak tube and first trigger signal generating units provides a first trigger signal in synchronization with a light beam under measurement. A first deflecting voltage generating unit applies a sine wave or a ramp deflecting voltage to the first deflecting electrodes in synchronization with the first trigger signal to cause the first deflecting electrodes to form the deflecting electric field. A second trigger signal generating unit provides a second trigger signal for starting observation of the waveform of the light beam under measurement. A second deflecting voltage generating unit applies a ramp deflecting voltage which synchronizes with the second trigger signal to the second deflecting electrodes to form a deflecting electric field which is lower in frequency than the deflecting electric field formed by the first deflecting electrodes, thereby to separate observed waveforms on the phosphor screen of optical phenomena which occur successively at a high frequency. A gate voltage generating unit drives the streak tube in synchronization with the second trigger signal.

7 Claims, 8 Drawing Sheets

DOUBLE SWEEP STREAK CAMERA DEVICE

BACKGROUND OF THE INVENTION

I. Field of the Invention

This invention relates to a double sweep streak camera device suitable, for instance, for separately measuring the plural waveforms of optical phenomenon which occur repeatedly with substantially the same period.

II. Background Information

A streak camera has been known as a device for measuring the variation in intensity distribution of a light emission which changes at high speed.

The streak camera includes an electron tube which is called a streak tube. The streak tube has a photocathode at one end, a phosphor screen (layer) at the other end and a pair of deflecting electrodes are disposed therebetween.

When a light beam is applied to the photocathode of the streak tube, the photocathode emits photoelectrons as a function of the incident light beam, thus forming a photoelectron beam which changes with time with changes in the intensity of the incident light beam.

When the photoelectron beam is passed through the electric field formed by the deflecting electrodes while advancing towards the phosphor screen, it is caused to sweep on the phosphor screen in one direction. As a result the change in time of intensity of the incident light beam appears as the change in luminance of the photoelectron beam in the direction of sweep (i.e., the direction of the time axis) on the phosphor screen. This is a so-called "streak image.38 The streak image is photographed with a camera or detected with a TV (television) camera, so that the distribution of brightness or luminance of the output image in the direction of sweep can be quantized for measurement of the change in time of intensity of the light beam.

There are two types of streak camera so called "single sweep streak camera" and "synchro-scan streak camera". Single sweep streak camera is used to measure a low repetition rate phenomena or a single event phenomena.

When the light beam to be measured is a repetitive pulsed light beam which occurs with the same waveform and with the same period, the sine wave voltage whose period is coincident with that of the pulsed light beam and whose phase is in constant relation with that of the pulsed light beam is applied to the deflecting electrodes of the streak tube. In this case, the streak images, having the same light emission distribution in the direction of sweep (i.e., the direction of time axis), can be laid one on another at one position on the output phosphor screen. If the streak images are laid one on another n times, the streak image brightness (or optical energy) on the output surface is substantially increased by a factor of n, and therefore even a considerably weak light emission can be observed with a satisfactory S/N ratio.

The high repetition laser employed usually is a mode locked dye laser having a repetition frequency of about 100 MHz. In this case, for instance in a one-second measurement, the integration can be made 100,000,000 times. The synchro scan streak camera is based on the above-described principle.

Figure 6:
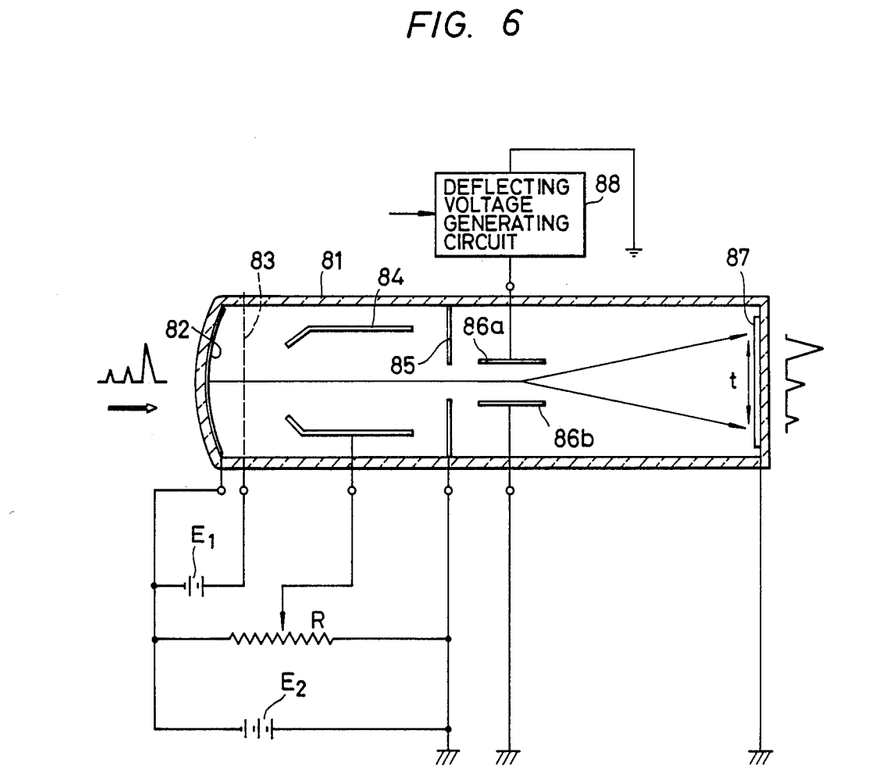
FIG. 6 is a schematic diagram showing one example of the arrangement of a conventional linear sweep type streak camera unit.

FIG. 6 is a block diagram of synchro scan streak camera with its streak tube sectioned along the plane which includes the optical axis.

As shown in FIG. 6, a cylindrical housing 81 has a photocathode 82 formed on the inner surface of its one end, and a phosphor screen 87 formed on the inner surface of its other end which is transparent. A voltage which is lower than the ground potential is applied to the photocathode 82 from a power source $E_2$.

A mesh electrode 83 is disposed adjacent to the photocathode 82. In order to accelerate photoelectrons emitted from the photocathode 82, a voltage higher than that of the photocathode 82 is applied to the mesh electrode 83 from a power source $E_1$. A focus electrode 84 is arranged between the mesh electrode 83 and an anode plate 85 having an opening at the center. The anode plate 85 is grounded. A voltage is obtained by using voltage divider 89 is apply some part of the voltage of source $E_2$ to the focus electrode 84 so that the focus electrode 84 serves as an electron lens which focuses the photoelectrons emitted from the photocathode 82 on the phosphor screen 87.

A pair of deflecting electrodes 86a and 86b made up of a pair of flat plates are disposed adjacent to the anode plate 85. A periodically varying voltage is applied across the deflecting electrodes by a deflecting voltage generating means 88.

Figures 7A, 7B:
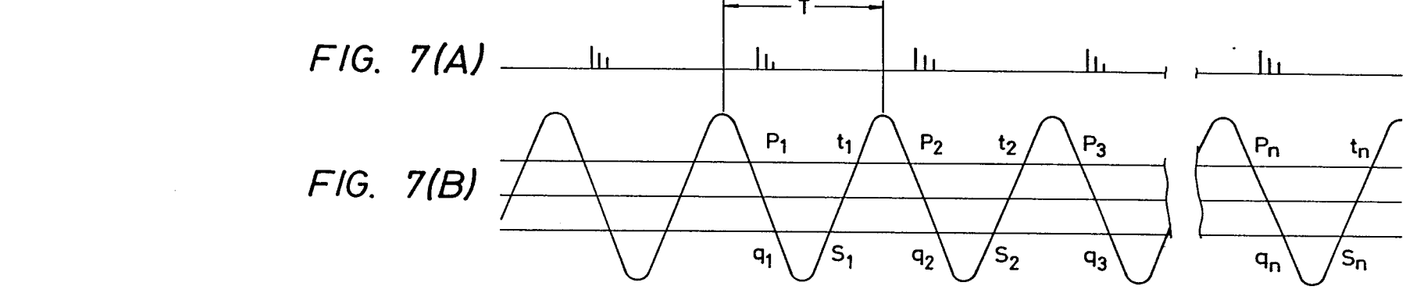
FIGS. 7A, 7B, and 7C are waveform diagrams for the description of the principle of a synchro scan streak system.
Figure 7C:
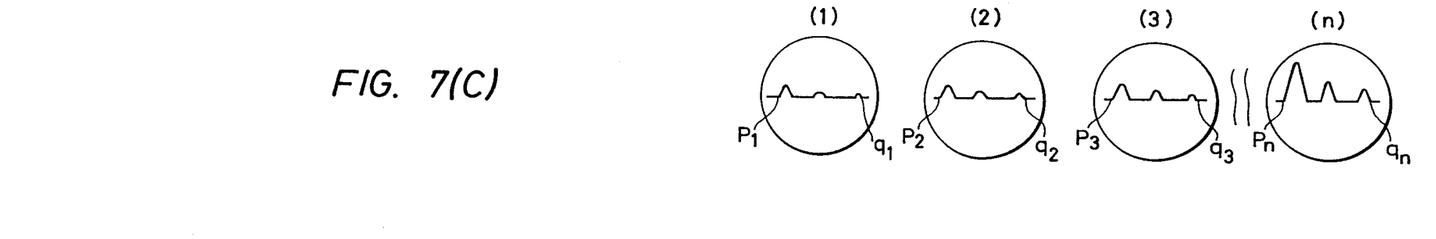

FIGS. 7A, 7B and 7C show a graphical representation to assist in explaining the operation of the synchro scan streak camera which is described above. In an ordinary synchro scan streak camera, the deflecting voltage generating means 88 produces a sine wave voltage as indicated in FIG. 7B. The parts $p_1-_1$, $p_2-q_2$ ... and $p_n-q_n$ of the sine wave voltage change from positive to negative are used to deflect the electron beam from the upper edge to the lower edge of the phosphor screen 87.

The deflecting voltage is selected so that its frequency is the same as the repetitive frequency of a light beam to be measured, and its phase is in synchronism with the period of the beam.

In order to observe the light emission phenomenon shown in FIG. 7A, a sine wave voltage as shown in FIG. 7B is applied across the deflecting electrodes 86a and 86b. This sine wave voltage which has a repetitive period can be generated synchronous in phase with a laser beam for exciting an object to be observed for instance. FIG. 7C shows the luminance distributions in the direction of the time axis on the phosphor screen 87 which are produced when the phosphor screen 87 is swept with the electron beam.

Assuming the optical intensity of the object under observation is low, the changes in the luminance distribution on the phosphor screen 87 which is provided at the first sweep with the part $p_1-q_1$ will be quite small as shown on screen (1) of FIG. 7C and often will not be detectable with the naked eye.

As the above-described operation is repeated, the luminance distribution becomes clear as is apparent from screens (2) and (3) of FIG. 7C. Theoretically, when the sweep is repeated n times, the luminance is approximately n times as great as that provided on the first sweep.

If the light beam under measurement is emitted for the sweep return periods $s_1-t_1$, $s_2-t_2$, ... and $s_n-t_n$ of the sine wave sweep voltage synchronous with the period T, shown in FIG. 7B, the streak image formed by the parts $s_1-t_1$, $s_2-t_2$, ... and $s_n-t_n$ will lie on that formed by the parts $p_1-q_1$, $p_2-q_2$, ... $p_n-q_n$. However, these streak images are reversed in the time axis direction on the phosphor screen. Therefore, in this case, the images do not add and the measurement cannot be accomplished.

Figure 8:
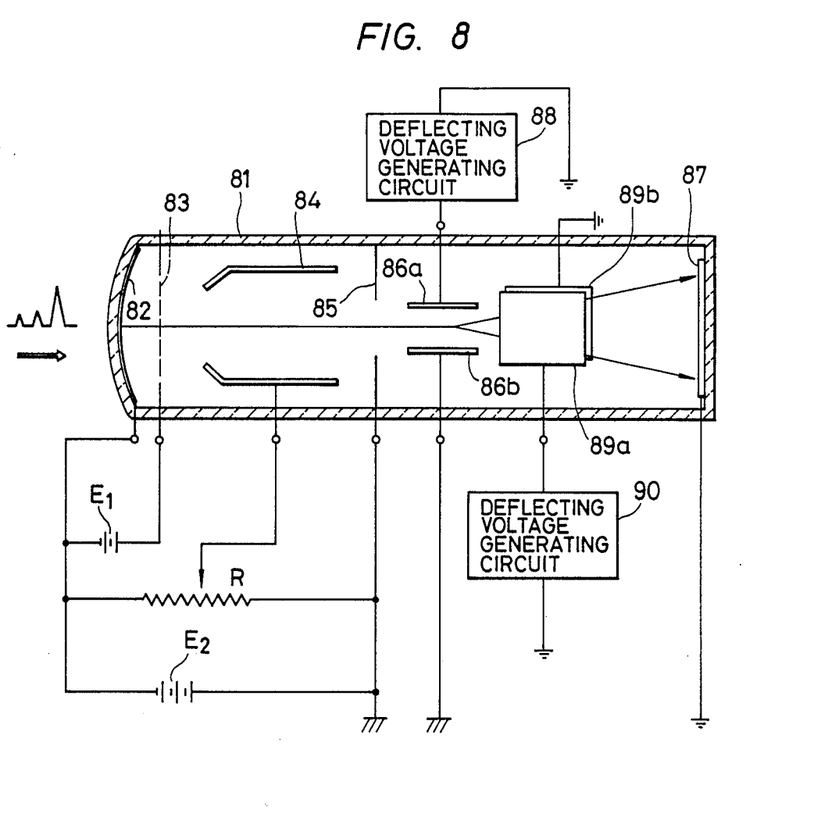
FIG. 8 is a schematic diagram showing one example of the arrangement of a conventional circular scan type streak camera.

The above-described difficulty can be eliminated by employing a circular scan system such as is shown in FIG. 8. In FIG. 8, parts corresponding functionally to those which have been already described with reference to FIG. 6 are designated by corresponding reference numerals or characters.

The streak tube has, in addition to the above-described streak deflecting electrodes 86a and 86b, another pair of deflecting electrodes 89a and 89b which deflect the electron beam in a direction perpendicular to the direction of deflection of the deflecting electrodes 86a and 86b.

The conventional circular scan system is essential to measure the change with time of a single phenomenon. In general, a light beam incident to the photocathode 82 is focused like a spot, and the photoelectron beam emitted from the spot is deflected to sweep the phosphor screen by the deflecting fields which are formed by applying sine wave voltages which differ in phase by 90° from each other to the two pairs of deflecting electrodes.

Figure 9:
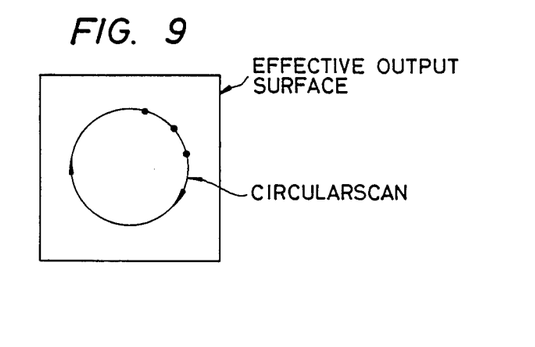
FIG. 9 is an explanatory diagram showing an output image of the circular scan type streak camera.

FIG. 9 is a diagram showing the output of the streak tube as viewed on the phosphor screen 87. As shown in FIG. 9, the sweep images appear circular; that is, the circular scan system is free from the above-described difficulty. Accordingly, the same repetitive light emissions can be observed as repetitive sweeps on each complete circular scan.

When a pulsed light beam's luminance or brightness is measured according to the synchronous scan system which has been described with reference to FIGS. 6 and 7, a number of problems take place because the streak images cannot be added to improve the S/N ration.

In the case of a specimen generating a fluorescence whose period is longer than half of the period of the sweep voltage employed, the skirt of the fluorescence spreads to the return sweep period, and the streak images formed by the sweeps in the opposite time direction lie on each other. Therefore, the accurate fluorescent period cannot be measured.

Furthermore, if, in measurement of a semiconductor laser beam generated with a period which is just a fraction of one period of the sweep, the laser beam will be generated also in the return sweep period. The streak images will lie on each other on the output surface of the phosphor screen 87. Thus, in this case also, the measurement cannot be made.

As was described above, these problems can be solved by the circular scan system. In order to obtain quantitative data from the streak image, it is necessary to detect the output image with a TV (television) camera.

Figure 10:
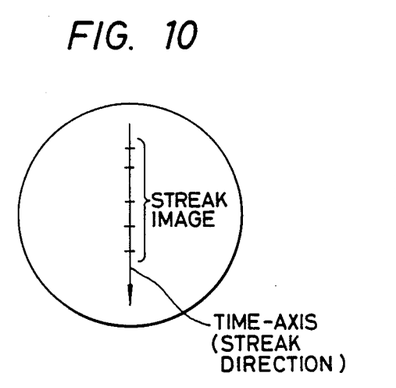
FIG. 10 is an explanatory diagram showing an output image of the linear sweep type streak camera unit.
Figure 11:
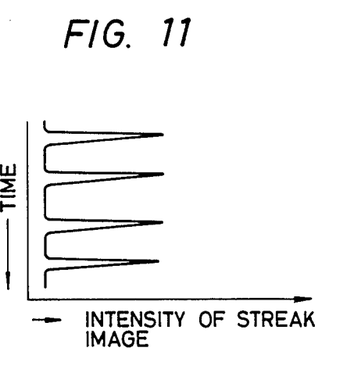
FIG. 11 is a graphical representation indicating the intensity distribution of the output image of the linear sweep type streak camera unit.

FIG. 10 shows a streak image obtained using a linear sweep. FIG. 11 is graphical representation indicating the intensity distribution of the streak image of FIG. 10 on the time axis. In the ordinary linear sweep, the TV camera operates in such a manner that the linear time axis is parallel with or perpendicular to the direction of scan of the image pickup tube. On the other hand, in the circular sweep, the operation is considerably more intricate.

Figure 12:
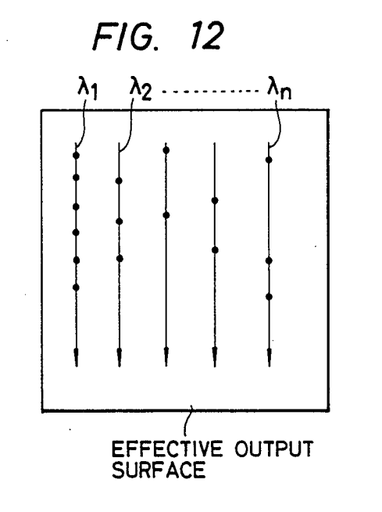
FIG. 12 is an explanatory diagram showing output images provided when spectrometry is performed with the linear sweep type streak camera unit.
Figure 13:
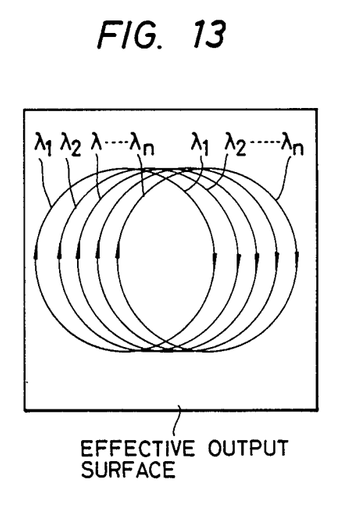
FIG. 13 is an explanatory diagram showing output images provided when spectrometry is carried out with the circular scan type streak camera.

If, as in time division spectrophotometry, a linear sweep is performed with various wavelength rays arranged perpendicular to the direction of sweep, then streak images according to each wavelength as shown in FIG. 12 can be obtained. Therefore the data can be readily obtained by detecting and showing the images with a TV camera. On the other hand, using a circular sweep for various wavelengths, streak images are formed as shown in FIG. 13.

A phenomenon called "afterglow" occurs with the fluorescent surface of the streak tube for several tens of microseconds. Therefore, in the case of light emitting phenomena occurring at a high repetitive frequency such as 100 MHz, the streak images are overlapped on the fluorescent surface and therefore cannot be distinguished from one another. It is difficult to read the secondary streak images on the fluorescent surface at a high speed of 100 MHz.

In the single sweep streak camera device, the maximum repetitive frequency of sweep is of the order of 1 KHz, and therefore, in the case where the light emitting phenomenon occur at a high repetitive frequency such as 100 MHz, it is impossible to observe each of the output pulse waveforms which occur successively in response to the light emitting phenomenon.

OBJECTS AND SUMMARY OF THE INVENTION

An object of the present invention is to eliminate the above-described difficulties accompanying a conventional streak camera device.

Another object of the present invention is to provide a double sweep streak camera device which separates from each other observed waveforms on the phosphor screen of each optical phenomena that occur successively at a high frequency, and permits the observation of each observed waveform of the optical phenomena.

These and other objects are achieved by a double sweep streak camera device for measuring selected characteristics of a repetitive light beam and including an image tube with a focusing electronic lens system having a rear stage, the device comprising a streak tube having a pair of first deflecting electrodes for forming a first deflecting electric field in a first direction at the rear stage of the focusing electronic lens system and a pair of second deflecting electrodes for forming a first deflecting electric field substantially perpendicular to said second deflecting electric field, a DC high voltage generating unit for supplying operating voltages to said streak tube, a first trigger signal generating unit for providing a first trigger signal synchronous with the light beam under measurement, a first deflecting voltage generating unit for applying a periodic deflecting voltage to said first deflecting electrodes in synchronization with said first trigger signal, to cause said first deflecting electrodes to generate said first deflecting electric field, a second trigger signal generating unit for providing a second trigger signal for starting observation of the waveform of the light beam under measurement, a second deflecting voltage generating unit responsive to said second trigger signal for applying a deflecting voltage that is lower in frequency than said periodic deflecting voltage and for applying said deflecting voltage to said second deflecting electrodes, and a gate voltage generating unit for causing said streak tube to perform a gating operation in synchronization with said second trigger signal.

BRIEF DESCRIPTION OF THE DRAWINGS

The manner by which the above objects and other objects, features, and advantages are attained will become fully apparent from the following detailed description when it is considered in view of the drawings, wherein.

DETAILED DESCRIPTION OF THE PREFERRED EMBODIMENTS

The double sweep streak camera device of the present invention includes a streak tube having a pair of first deflecting electrodes for forming a deflecting electric field in the direction of a time axis at the rear stage of a focusing electronic lens system in an image tube and a pair of second deflecting electrodes for forming a deflecting electric field substantially perpendicular to the aforementioned deflecting electric field formed by the first deflecting electrodes. A DC high voltage generating unit supplies operating voltages to the streak tube and a first trigger signal generating units provides a first trigger signal in synchronization with a light beam under measurement. A first deflecting voltage generating unit applies a sine wave or a ramp deflecting voltage to the first deflecting electrodes in synchronization with the first trigger signal to cause the first deflecting electrodes to form the deflecting electric field. A second trigger signal generating unit provides a second trigger signal for starting observation of the waveform of the light beam under measurement. A second deflecting voltage generating unit applies a ramp deflecting voltage which synchronizes with the second trigger signal to the second deflecting electrodes to form a deflecting electric field which is lower in frequency than the deflecting electric field formed by the first deflecting electrodes. A gate voltage generating unit drives the streak tube in synchronization with the second trigger signal.

The first deflecting voltage generating unit is adapted to apply to the first deflecting electrodes a sine wave synchronous with the light beam under measurement or a high-speed repetitive ramp voltage. The second deflecting voltage generating unit is adapted to apply a ramp deflecting voltage to the second deflecting electrodes in synchronization with the second trigger signal, so that the streak images appear at intervals.

The streak tube comprises a photocathode, a mesh electrode, a focusing electrode, an anode having an opening, first and second deflecting electrodes which form electric fields perpendicular to each other, and phosphor screen which are arranged in a vacuum container in the stated order.

The gate voltage generating unit is adapted to apply a gate voltage to the photocathode and a microchannel plate of the streak tube for the period of the deflection effected by the second deflecting electrodes in synchronization with the second trigger signal, to operate the streak tube. Alternatively, the gate voltage generating unit can apply a gate voltage to the photocathode and the microchannel plate of the streak tube for the period of the deflection, except for the period of a return sweep by the first deflecting electrodes, which is effected by the second deflecting electrodes, in synchronization with the second trigger signal and the first trigger signal.

Figure 1:
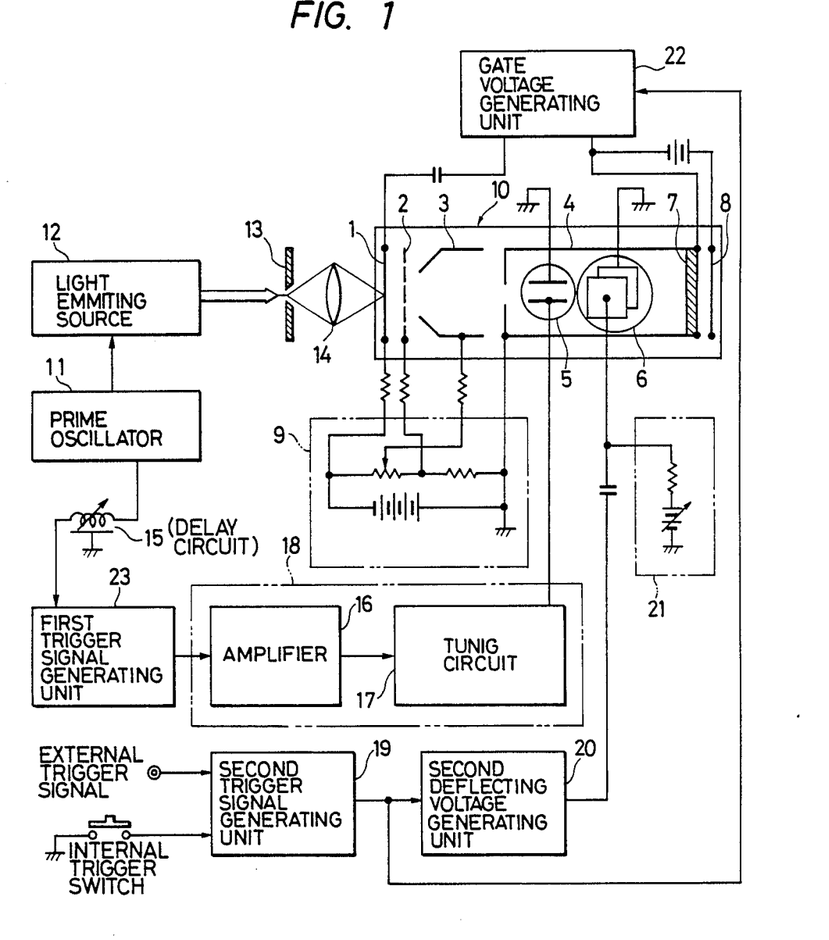
FIG. 1 is a schematic block diagram showing a first example of a streak camera unit according to this invention.

As shown in FIG. 1, a photocathode 1, a mesh electrode 2, a focusing electrode 3, an anode plate 4 having an opening at its center, a pair of first deflecting electrodes 5, a pair of second deflecting electrodes 6, a microchannel plate (MCP) 7, and a phosphor screen 8 are provided in the vacuum container of a streak tube 10. The sweep direction of the second deflecting electrode 6 is perpendicular to that of the first deflecting electrode 5.

A DC high voltage generating unit 9 supplies operating voltage to the electrode of the streak tube 10. More specifically, with respect to a reference potential, e.g., ground potential, −5 KV may be applied to the photocathode 1 of the streak tube 10, −4 KV to the mesh electrode 2, −4.4 KV to the focusing electrode 3, and 0 V to the anode plate 4. The phosphor screen 8, one of the pair of first deflecting electrodes 5, and one of the pair of second deflecting electrodes 6 are connected to the reference potential (or grounded).

It is assumed that a light emitting source 12 under measurement emits a light beam at a frequency of 80 MHz in synchronization with a prime oscillator 11. A part of the output of the prime oscillator 11 is applied through a delay circuit 15 to a first trigger signal generating unit 23 where it is subjected to waveform stabilizing. The stabilized waveform is applied as a first trigger signal to a first deflecting voltage generating unit 18.

The first trigger signal applied to the first deflecting voltage generating unit 18 is amplified by a high frequency amplifier circuit 16 and outputted through a tuning circuit 17. That is, the first deflecting voltage generating unit 18 provides a sine wave voltage synchronous with the first trigger signal and the sine wave is applied to the first deflecting electrode 5.

The phase relation between the light beam under measurement and the deflecting voltage applied to the first deflecting electrode 5 can be freely determined by adjusting the delay time of the delay circuit 15.

A second trigger signal generating unit 19 produces a second trigger signal in response to an external or internal trigger signal. The second trigger signal is used to determine the timing of starting the observation of a light beam emitted from the light emitting source. The second trigger signal thus produced is applied to a second deflecting voltage generating unit 20 and a gate voltage generating unit 22.

The second deflecting voltage generating unit 20 outputs a ramp voltage having an amplitude that changes with a predetermined inclination in synchronization with the second trigger signal. The ramp voltage is applied as a deflecting voltage to the second deflecting electrode 6 of the streak tube 10.

In a horizontal position adjusting circuit 21, a DC voltage is superposed on the ramp voltage outputted by the second deflecting voltage generating unit 20 to adjust the horizontal position of the streak image. The gate voltage generating unit 22, in response to the second trigger signal, produces two different gate voltages for gating the photocathode 1 and the microchannel plate 7. The gate voltage outputted by the gate voltage generating unit 22 are applied to the photocathode 1 and the microchannel plate 7 in the streak tube 10.

Figure 2:
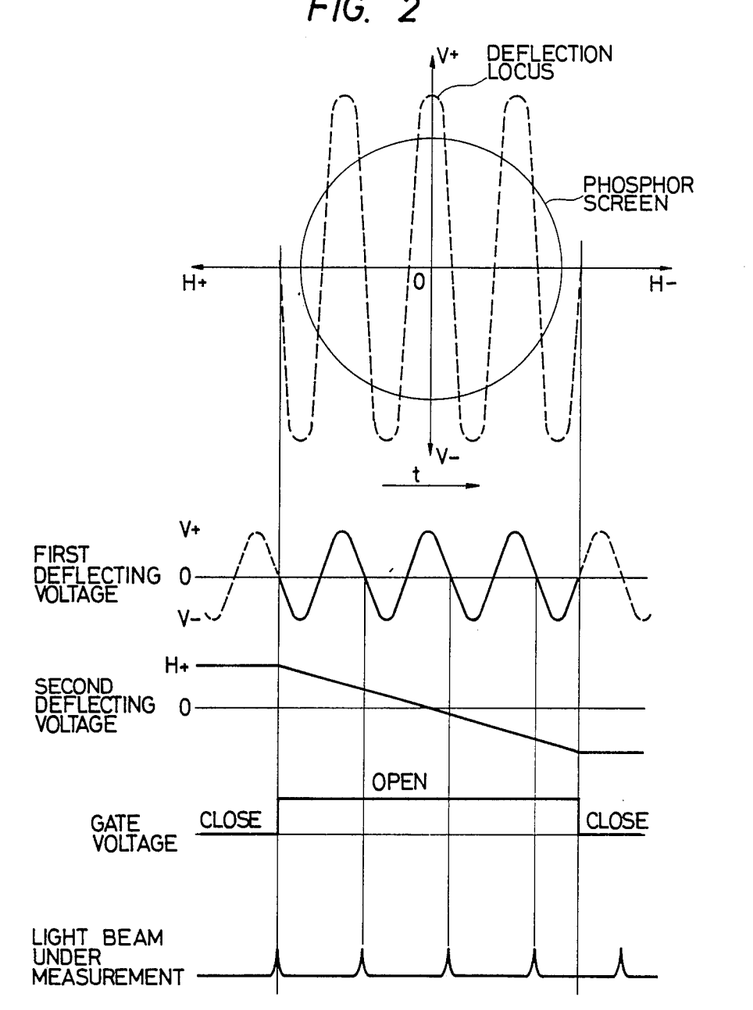
FIG. 2 is a waveform diagram of describing the operation of the streak camera device shown in FIG. 1.

FIG. 2 is a waveform diagram for a description of one example of the operation of the above-described streak camera device according to the present invention. A voltage of 600 Vp-p is applied to the first deflecting electrode 5, and similarly a voltage 600 Vp-p is applied to the second deflecting electrode 6, wherein Vp-p represents a total amplitude of a sine wave voltage.

In the above-described streak camera device, the deflecting sensitivities of the first and second deflecting electrodes 5 and 6 in the streak tube 10 may be 50 mm/KV and 28 mm/KV, respectively. In the case where the diameter of the output phosphor screen 8 of the streak tube 10 is 15 mm, the light beam describes on the phosphor screen 8 the locus as indicated by the broken line in FIG. 2, being deflected by the deflecting electrodes.

The first deflecting voltage generating section 18 performs a 80 MHz sine wave deflection in synchronization with the first trigger signal, and the second deflecting voltage generating section carries out a 200 ns/600 V ramp voltage deflection with the aid of the second trigger signal.

The second trigger signal causes the gate voltage generating unit to apply the gate voltages to the streak tube 10 so that the streak tube 10 is operated only for the deflection period of the second deflecting voltage generating unit, that is, the noise attributing to the incident light which is provided during the period other than the observation period is eliminated.

Figure 3:
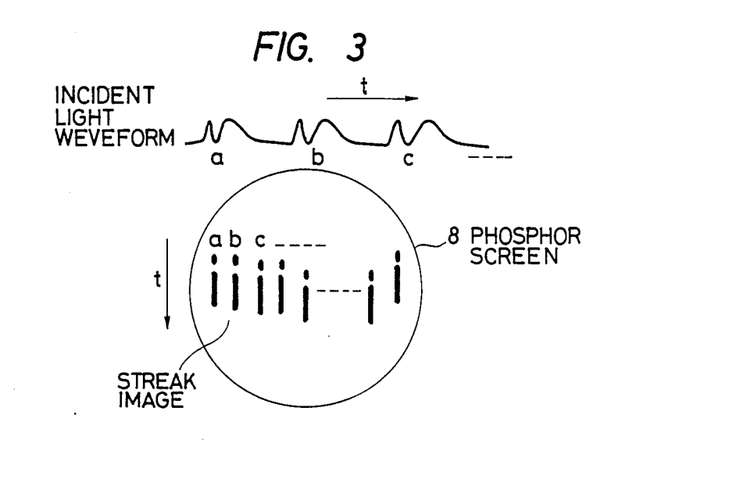
FIG. 3 is an explanatory diagram indicating the waveform of an incident light beam with the streak images thereof in one example of the operation of the streak camera device shown in FIG. 1.

FIG. 3 is a graphical representation indicating the waveform of an incident light beam with the image on the phosphor screen. As shown in FIG. 3, the streak images of the optical pulses occurring at a frequency of 80 MHz are arranged successively in the left-to-right direction on the phosphor screen 8. Therefore, the phase, pulse width, rise time, and fall time of each of the optical pulses can be measured.

Figure 4:
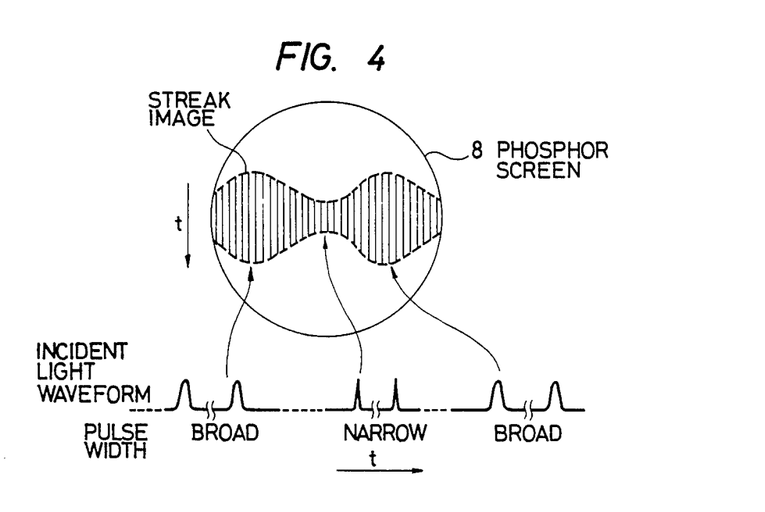
FIG. 4 is an explanatory diagram indicating the waveform of an incident light beam with the streak images thereof in another example of the operation of the streak camera device shown in FIG. 1.

FIG. 4 is a graphical representation indicating another example of the operation of the streak camera device according to the present invention. In this operation, when compared with the above-described operation, the deflection time of the second deflecting voltage generating unit 20 is sufficiently longer than the period of the sine wave deflection of the first deflecting voltage generating unit 18. Therefore, as shown in FIG. 4, the optical pulses appear adjacent to one another in the horizontal direction. Accordingly, variations in phase and pulse width of the light beam under measurement can be continuously observed. The parts of the incident light waveform which are smaller in pulse width appear as streak images shorter in the time axis direction.

Figure 5:
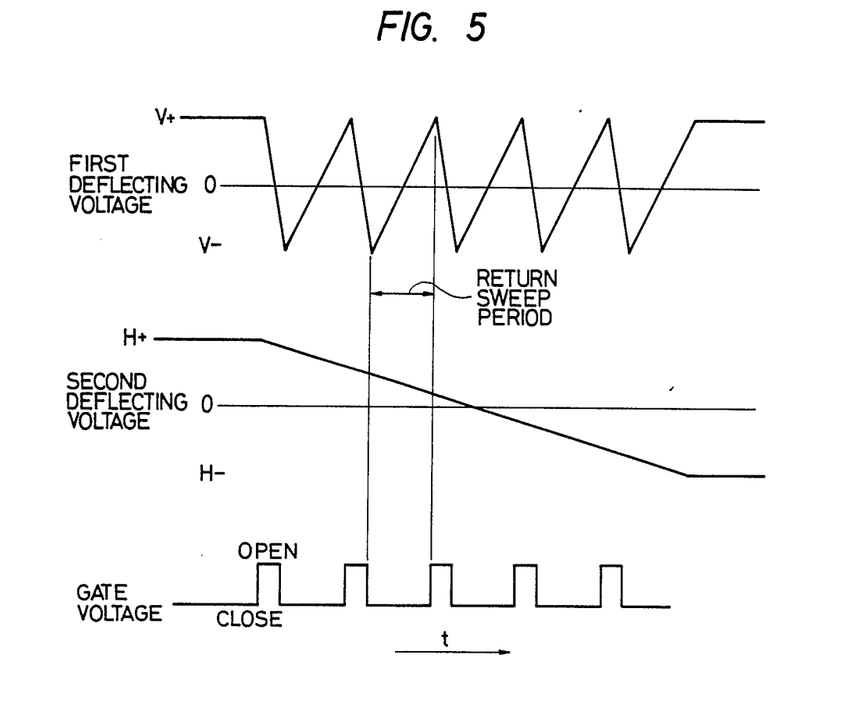
FIG. 5 is a waveform diagram for a description of the operation of another embodiment of the double sweep streak camera device according to the present invention.

FIG. 5 is a waveform diagram for a description of another embodiment of the double-sweep streak camera device according to the present invention in which the first deflecting voltage and the gate voltage are different from those in the first example of the streak camera device.

As shown in FIG. 5, it is not always necessary that the deflecting voltage generated by the first deflecting voltage generating unit 18 be a sine wave. In the second example of the streak camera device according to the present invention, the first deflecting voltage generating unit 18 is so designed as to generate a saw-tooth wave deflecting voltage in synchronization with the output signal of the first trigger signal generating unit 23 as shown in FIG. 2. Furthermore, in the second example, the gate voltage generating unit 22 is made synchronous with the saw-tooth wave deflecting voltage, so that the gate is closed for the return sweep period of the deflection to suspend the operation of the streak tube and to prevent the double exposure which otherwise would be caused by the return sweep which is the sweep of from V− to V+ corresponding to the fly-back period.

As was described in detail, the double-sweep streak camera device according to the present invention can detect successively occurring light beams as streak images on the phosphor screen of the streak tube which occur at predetermined intervals. Thus, according to the present invention, the waveforms of high-speed optical phenomena which occur repeatedly at a frequency of about 100 MHz can be separately observed, and the variation in phase or in pulse width of a continuous light beam can be measured.

What is claimed:

1. A double sweep streak camera device for measuring selected characteristics of a repetitive light beam and including an image tube with a focusing electronic lens system having a rear stage, the device comprising:
    a streak tube having a pair of first deflecting electrodes for forming a first deflecting electric field in a first direction at the rear stage of the focusing electronic lens system and a pair of second deflecting electrodes for forming a second deflecting electric field substantially perpendicular to said first deflecting electric field;
    a DC high voltage generating unit for supplying operating voltages to said streak tube;
    a first trigger signal generating unit for providing a first trigger signal synchronous with the light beam under measurement;
    a first deflecting voltage generating unit for applying a periodic deflecting voltage to said first deflecting electrodes in synchronization with said first trigger signal, to cause said first deflecting electrodes to generate said first deflecting electric field;
    a second trigger signal generating unit for providing a second trigger signal for starting observation of the waveform of the light beam under measurement;

a second deflecting voltage generating unit responsive to said second trigger signal for applying a deflecting voltage that is lower in frequency than said periodic deflecting voltage and for applying said deflecting voltage to said second deflecting electrodes; and a gate voltage generating unit for causing said streak tube to perform a gating operation in synchronization with said second trigger signal.

2. A device as claimed in claim 1, wherein said periodic deflecting voltage applied by said first deflecting voltage generating unit is a sine wave.

3. A device as claimed in claim 1, wherein said periodic deflecting voltage applied by said deflecting voltage generating unit is adapted to apply a high-speed repetitive ramp voltage.

4. A device as claimed in claim 1, wherein said deflecting voltage applied by said second deflecting voltage generating unit is a ramp deflecting voltage and said second deflecting voltage generating unit is adapted to apply said ramp deflecting voltage to said second deflecting electrodes in synchronization with said second trigger signal.

5. A device as claimed in claim 1, wherein said streak tube comprises a vacuum container enclosing a photocathode, a mesh electrode, focusing electrodes, a microchannel plate, and a phosphor screen.

6. A device as claimed in claim 5, wherein said gate voltage generating unit is adapted to apply a gate voltage to said photocathode or said microchannel plate of said streak tube for the period of the deflection effected by said second deflecting electrodes in synchronization with said second trigger signal.

7. A device as claimed in claim 5, wherein said gate voltage generating unit is adapted to apply a gate voltage to said photocathode or said microchannel plate of said streak tube for the period of deflection effected by said second deflecting electrodes, except for a period of a return sweep by said first deflecting electrodes in synchronization with said second trigger signal and said first trigger signal.

* * * * *